United States Patent [19]

Castellani

[11] Patent Number: 4,679,464
[45] Date of Patent: Jul. 14, 1987

[54] SHAFT-MOUNTED PLANETARY SPEED-REDUCING GEAR UNIT FEATURING A BALANCED, SELF-ALIGNING AND SELF-DISTANCING RING GEAR

[76] Inventor: Giovanni Castellani, 9, Via E. Orlandi, 41100 Modena, Italy

[21] Appl. No.: 688,829

[22] Filed: Jan. 2, 1985

[30] Foreign Application Priority Data

Jan. 24, 1984 [IT]  Italy ............................ 40007 A/84

[51] Int. Cl.⁴ ............................................. F16H 57/08
[52] U.S. Cl. .................................... 74/788; 74/785; 267/64.15; 267/124; 188/303
[58] Field of Search ...................... 74/785, 411, 788; 267/64.15, 124; 188/303

[56] References Cited

U.S. PATENT DOCUMENTS

| | | | |
|---|---|---|---|
| 1,923,777 | 8/1933 | Delaval-Crow | 384/518 |
| 2,992,532 | 7/1961 | Miller | 74/411 X |
| 3,383,937 | 5/1968 | Toenne et al. | 74/467 |
| 4,091,897 | 5/1978 | Andrepont | 188/303 X |
| 4,266,639 | 5/1981 | Schloth | 188/314 X |
| 4,312,247 | 1/1982 | Silvestri | 74/574 |

FOREIGN PATENT DOCUMENTS

| | | | |
|---|---|---|---|
| 864183 | 1/1953 | Fed. Rep. of Germany | 74/411 |
| 120949 | 9/1980 | Japan | 74/785 |
| 646124 | 2/1979 | U.S.S.R. | 74/785 |

*Primary Examiner*—Leslie Braun
*Assistant Examiner*—Joseph M. Rolnicki
*Attorney, Agent, or Firm*—Lowe Price LeBlanc Becker & Shur

[57] ABSTRACT

In the speed reducer disclosed, the gear ring (12) of the planetary gear train is connected via a pair of diametrically-opposed appendages (13) with a corresponding pair of vertically disposed and parallel double-acting hydraulic cylinders (14) suspended via ball-and-socket joints beween the gear unit and a fixed structure. Each cylinder shows a low pressure (31) and a high pressure (32) oil chamber connected to low and high pressure hydraulic accumulators (33, 34) respectively by means of respective throttle valves (35, 36) in parallel with respective ball check valves (37, 38). There are no bearings between the gear case (18, 19) and the shaft instead, the output shaft hub is fitted with an assembly which incorporates thrust rings and a rotary seal (20) featuring diametrial-flow lubrication to ensure freedom from foreign matter.

2 Claims, 6 Drawing Figures

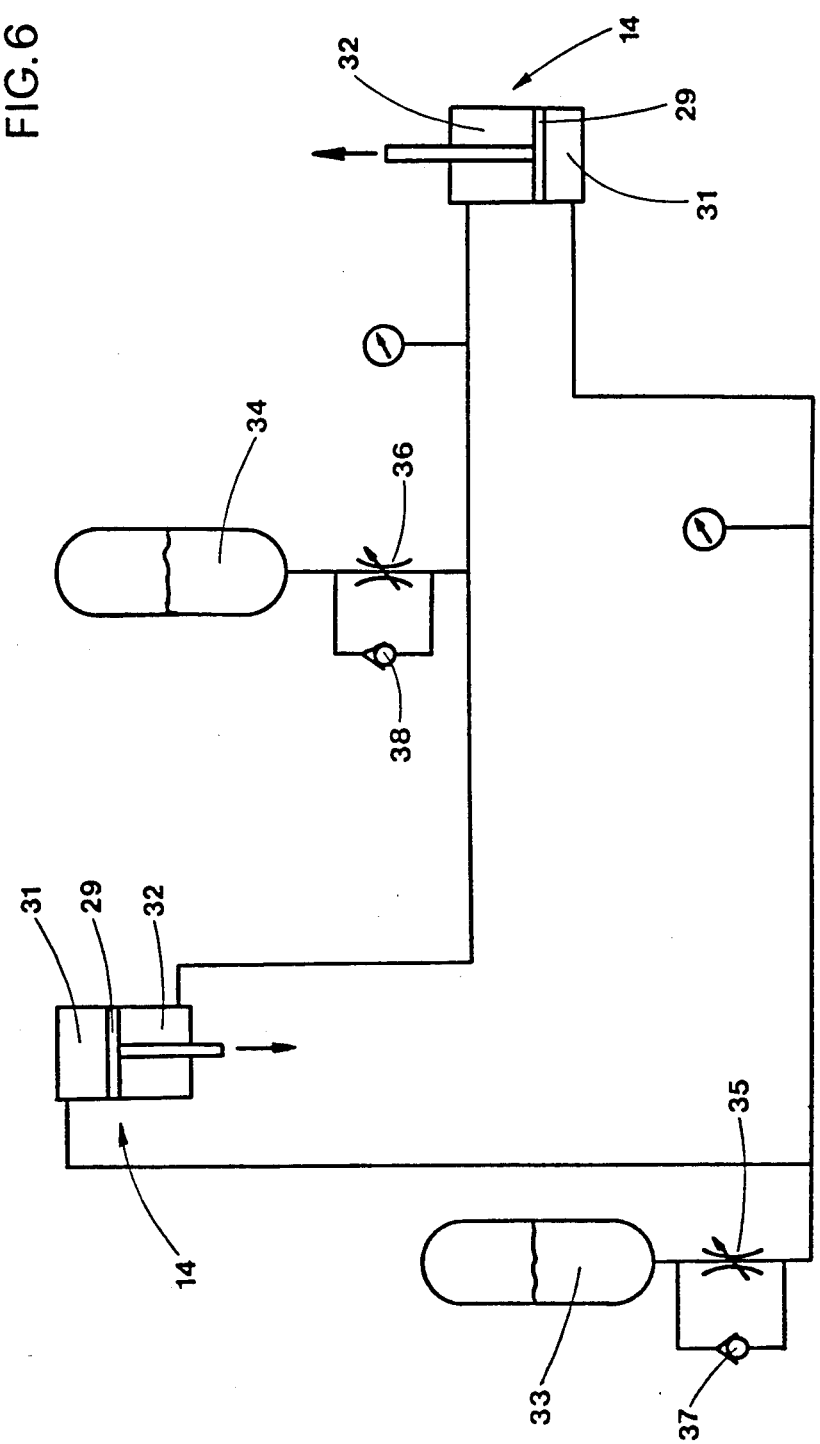

SHAFT-MOUNTED PLANETARY SPEED-REDUCING GEAR UNIT FEATURING A BALANCED, SELF-ALIGNING AND SELF-DISTANCING RING GEAR

The invention relates to a shaft-mounted speed reducer featuring a planetary gear train with a balanced self-aligning and self-distancing ring gear—that is, a mechanical gear unit wherein dynamic load on the ring gear (disregarding the effect of dead weight) is transmitted to the driven shaft purely as torque, without any radial load being generated.

In the field of application concerned, the prior art embraces three basic types of speed-reducing gear units: integral with the machine; mounted at the input side of the driven machine and coupled via a drive shaft or other transmission; and shaft-mounted—i.e. overhung from the driven machine power shaft. There are also drives which combine features of all three basic types. One type of conventional shaft-mounted gear unit has an output hollow shaft which is fitted to the extending power shaft of the driven machine. The outer case of such a unit is anchored by means of a torque arm which absorbs mechanical reaction of the assembly, and drive is transmitted from the prime mover to the gear unit input shaft by a belt. Conventional shaft-mounted torque arm gear units are the cause of strong, often inadmissible radial loads on the power shaft owing to the pull of the torque arm against the axis of the shaft; this radial load is incrased further by torsional dynamic overloads set up in the driven machine. However, the incorporation of a fluid shock absorber into the torque arm to compensate for such defects will produce fluctuations in the tension of the drive belt or chain. The option also exists of a centrally-located drive shaft incorporating a coupling, which creates difficulties by reason of the need for its adjustment; adoption of a shock-absorbing or flexible torque arm would in any case rule out a central shaft.

Another type of shaft-mounted gear unit has a pair of parallel arms connected to a plate integral with the ring gear. The arms drop downwards in order to engage the two ends of a transverse member offset toward the rear and anchored at mid-point, thereby affording a reaction which impedes rotation of the ring gear. This design is unsuitable for high torque applications, and offers no flexibility whatsoever, which is damaging to a drive that may be subject to high starting overload and marked variations in torque during normal running. Thus, there are many applications for which the shaft-mounted gear unit cannot be used, applications in which other types of speed reducer ultimately adopted will in turn bring their own problems.

As regards positioning of the ring gear, the prior art envisages alignment relative to the planet carrier by means of bearings, though gear teeth tolerances and float of the bearings are such as to unbalance the even distribution of load between planet pinions, effects of which are transmitted to the ring gear; gears must therefore be generously proportioned in order to withstand related stresses.

The prior art thus stands in need of improvement with regard to the possibility of absorbing the torque reaction produced by shaft-mounted gear units, whilst avoiding the drawbacks outlined above.

From the foregoing, one may discern the need for a solution to the technical problem of embodying a shaft mounted gear unit which generates no overload on the driven shaft, which permits of absorbing dynamic loads, which generates no radial load, and which is compact and economic to manufacture. Such features automatically widen the scope for rational and effective utilization of shaft-mounted gear units so as to cover applications thus far considered incompatible, one example of which, amongst the many possible, is the drum drive in ball or roller grinding mills and rotary driers.

Conventional drum drives in such machines make use of a final reduction transmitted through an external tooth ring gear fashioned in two halves, which is bolted to the drum and driven by one or more pinions. There are drawbacks with such an arrangement, namely: pitch errors occasioned by the join in the two gear halves; stress on the teeth from dynamic loads, especially on starting; further dynamic load generated by the gradual increase in bearing float; difficulty in adjusting bearings for correct alignment of the gear teeth, caused by flexure of the drum when hot; distortion of the external gear when handling hot materials; lubrication problems caused by the lack of a sealed gear casing; meaning that drive components become dust-laden and require treatment with special oils, incurring servicing down-time.

Drive components integral with the driven machine are to be avoided not only for the reasons stated above, but also because of the contingent nature of operating conditions which renders adoption of surface-hardened toothing an uncertain proposition, given the possibility of scaling-off.

The practical upshot is that one has large speed reducers mounted at the driven machine input and coupled through a drive shaft with two universal joints, involving large shaft diameters in order to handle the drum's high torque requirement, with high attendant overloads, as well as costly joints, shafts and gears whose heavy duty specification will not generally be matched by standard production components.

The invention disclosed surmounts difficulties thus far described by adopting a shaft-mounted gear unit wherein: the ring gear of the planetary gear train is connected by way of a pair of diametrically opposed appendages to a pair of vertically-disposed balancing and shock-absorbing hydraulic cylinders located parallel with each other at opposite sides of the gear unit and suspended between the ring gear and a rigid structure; the gear unit output shaft is coupled with the driven machine power shaft via a single bearing only, to ensure alignment of the gear unit at standstill, whereas the gear ring is integral with the gear case though not associated with its shaft via bearings, and is permitted a degree of end float relative to the planet pinions; the planet pinions turn on their respective shafts by way of self-aligning roller bearings; the output side of the gear case is end of the driven machine power shaft and made fast thereto by an axial clamp screw, the coupling between gear case and hub consisting of a labyrinth seal with diametral-flow lubrication and generous end float; said labyrinth seal being combined with the axial seal of the machine power shaft. Advantages of the invention are: absorption of dynamic loads without overloads generated on the driven shaft; uniform distribution of load between the planet pinions; compact dimensions; self-alignment both of the gear train and the overall gear unit; diametral-flow rotary seal lubrication removing foreign matter; economy of manufacture; a wider range of uses for shaft-mounted units to cover hitherto incompatible applications; uncomplicated mounting arrangement and reduced servicing requirements; and the transmission of markedly high torque values.

The invention will now be described in detail, by way purely of example, with the aid of the five sheets of drawings attached, in which:

FIG. 6 is the symbolized hydraulic circuit diagram.

Figure 1:
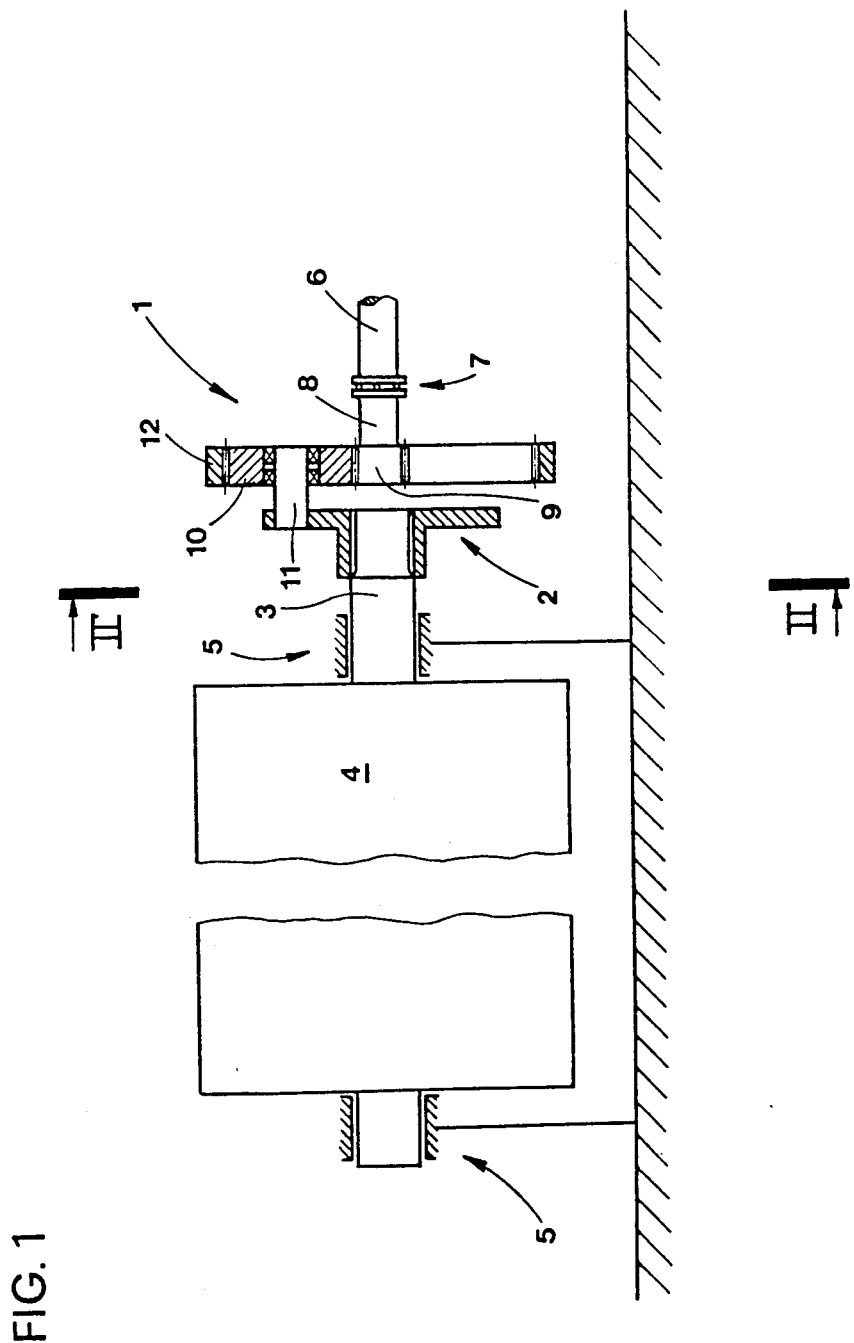
FIG. 1 is a side view of the planetary gear unit mounted to a rotary drum of whatever type, part cutaway.
Figure 2:
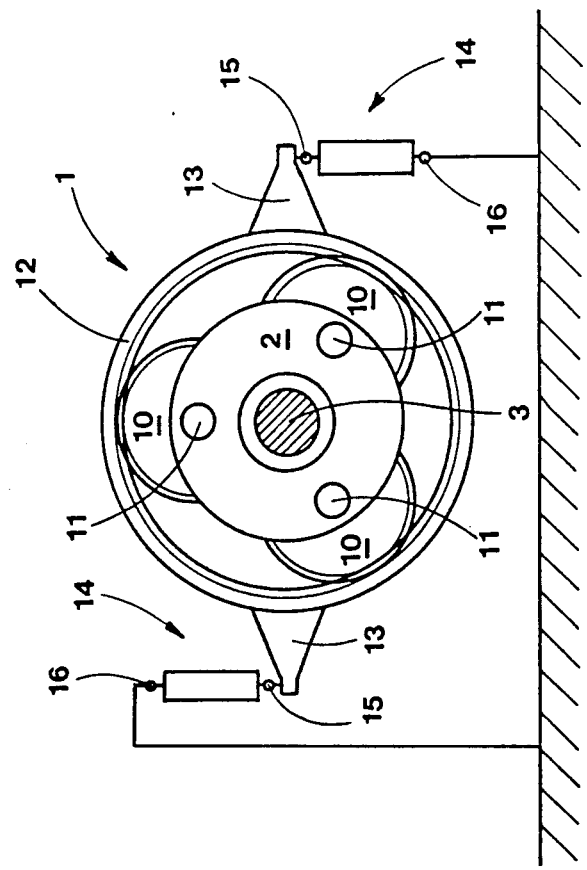
FIG. 2 is a frontal view of the gear unit seen partly in section, taken through II—II in FIG. 1.
Figure 3:
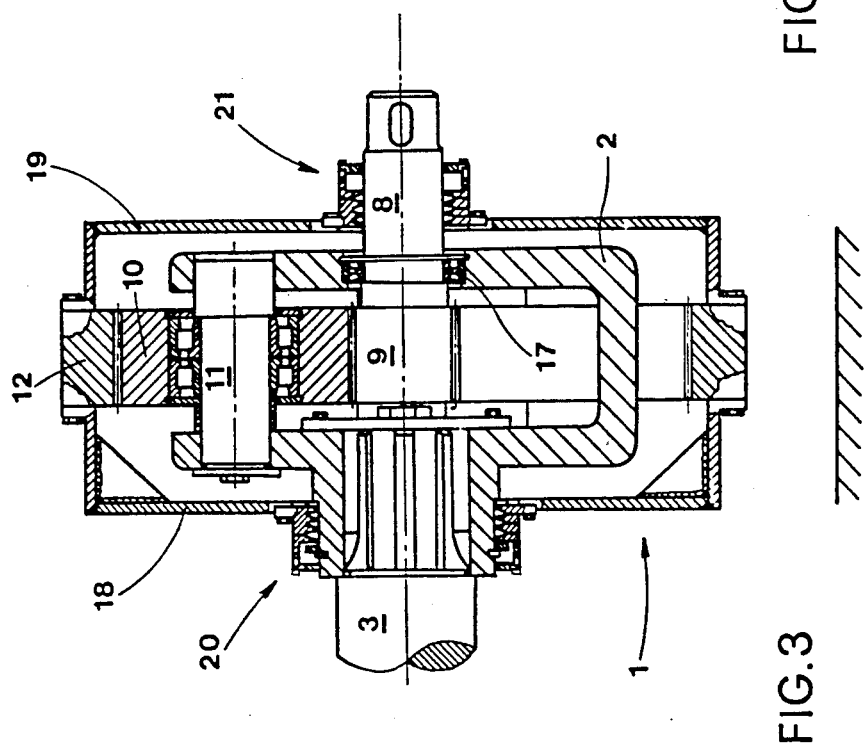
FIG. 3 is a large scale longitudinal section through the gear unit as seen in FIG. 1.
Figure 5:
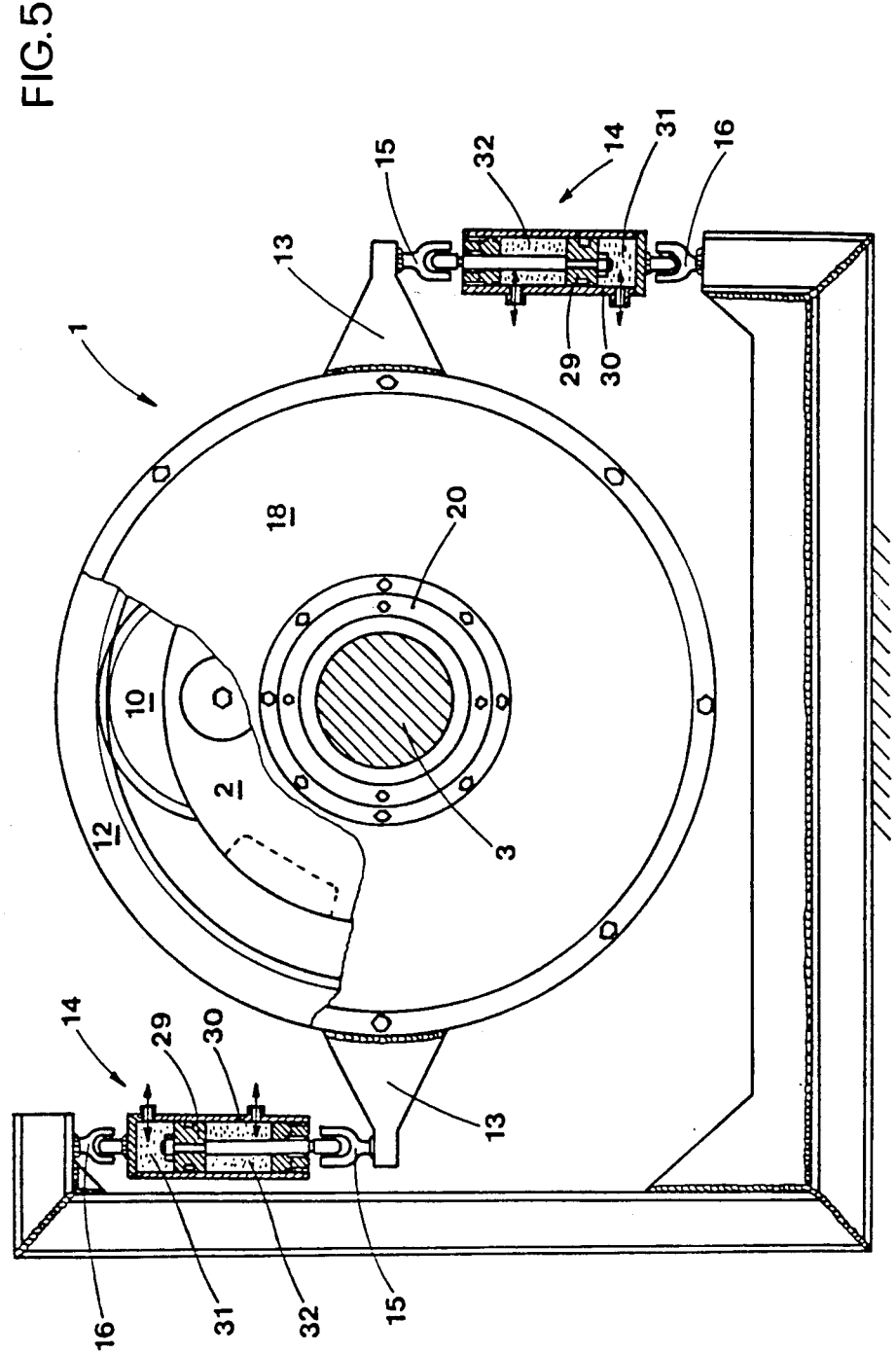
FIG. 5 is a frontal view of the gear unit seen in FIG. 2, in cutaway and on larger scale, which illustrates the hydraulic rods.

With reference to the drawings, 1 denotes the speed reducer, which is a planetary gear unit whose planet carrier 2 is keyed to the power shaft 3 of the driven machine and clamped axially between a shoulder offered by the shaft 3 itself on the outside, and a disk on the inside, by means of a bolt screwed into the shaft end. The power shaft drives the drum 4 of, say, a grinding mill, or a driven machine in general, and is journalled by journal bearings 5.6 denotes the driving shaft which is connected by way of a suitable coupling 7 to the gear unit input shaft 8; 9 denotes a sun gear integral with shaft 8. Planetary pinions 10, each turning on a relative shaft 11 integral with the planet carrier 2, mesh with the internal teeth of the ring gear 12, which is provided with a pair of diametrically-opposed lug-type appendages 13 (FIG. 2). 14 denotes a pair of vertically-disposed double-acting hydraulic cylinders located parallel with one another at opposite sides of the gear unit, each connected at one end to a respective appendage 13 via a ball-and-socket joint 15, and at the remaining end, via a further ball-and-socket joint 16, to a rigid structure which might be composed of a base with two appropriately fashioned uprights as in FIG. 5. 17 (FIG. 3) denotes a self-aligning type roller bearing fitted to the gear unit input shaft 8, which ensures correct axial positioning of sun gear 9 and permits its self-alignment by virtue of the generous degree of play allowed to the rollers, and the self-aligning shape of the bearing. The gear case, filled with lubricant to a given level, is in two halves 18 and 19 which are made fast to the gear ring 12, the first half 18 incorporating a rotary seal 20 at the join with the hub of the planet carrier 2 keyed to power shaft 3, and the second half 19 fitted with a rotary seal 21 at the join with the gear unit input shaft 8.

Figure 4:
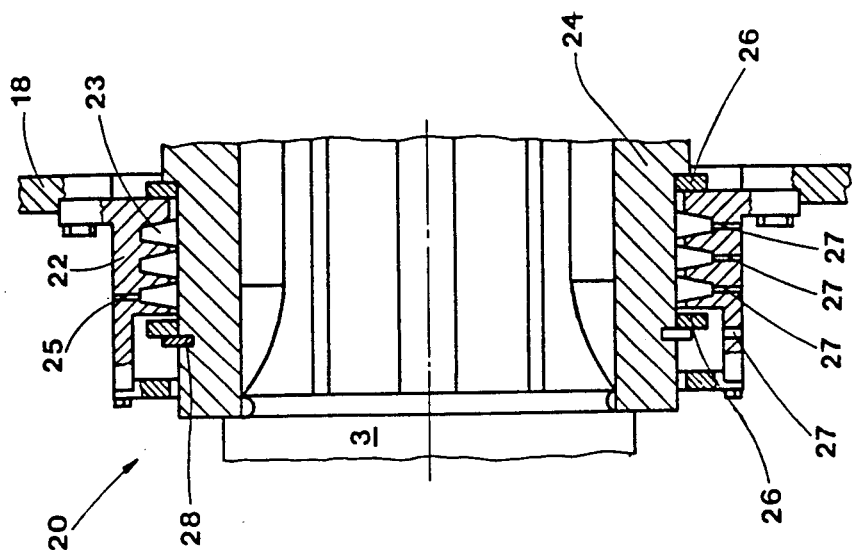
FIG. 4 is the enlargement of a detail of FIG. 3 showing the rotary oil seal, and the end of the output shaft which abuts with a shoulder offered by the driven machine power shaft.

Gear case half 18 has internal triangular stiffening ribs which enhance axial stability of the ring gear. 22 denotes a sleeve (FIG. 4) fitted to the face of gear case half 18 and provided with internal grooves 23, which is fitted over the hub 24 of the planet carrier 2 and allowed a generous degree of end float relative to the output shaft and driven shaft. A radial lubricator orifice 25 in the sleeve gives access to one of the grooves 23 for the dual purpose of removing any foreign matter and keeping two thrust rings 26 lubricated. Radial drain orifices 27 are provided in the underside of the sleeve through which lubricant flows out from the grooves 23; 28 denotes a snap ring. 29 denotes the piston of each of the hydraulic cylinders 14, stroking within a relative barrel 30. 31 denotes a low pressure oil chamber whereas 32 denotes a high pressure oil chamber in each cylinder 14. 33 and 34 (FIG. 6) denote respective low and high pressure hydropneumatic accumulators, and 35 and 36 are respective throttle valves connected in parallel with two relative ball check valves 37 and 38.

A balanced planetary gear unit according to the invention functions thus: with the drive shaft 6 set in rotation, planet pinions 10 likewise rotate and turn the planet carrier 2 which in turn transmits motion to the driven machine 4. The ring gear 12, anchored against rotation to the pair of hydraulic cylinders 14, is in receipt of torque which will certainly vary in entity at starting, and which may or may not vary as a result of intermittent fluctuations in mechanical load. An increase in torque causes fluid to exhaust from the high pressure oil chambers 32 of the two cylinders 14 to the high pressure accumulator 34 via throttle valve 36, thereby producing a shock-absorbing effect which both reduces overload of mechanical parts and prevents oscillation. At the same time, fluid supplied under low pressure by accumulator 33 via ball check valve 37 enters the low pressure oil chambers 31 of each cylinder. As torque through ring gear 12 decreases, the flow of fluid is reversed. By adopting paired hydraulic balancing cylinders 14 the driven machine power shaft 3 remains free of radial load.

I claim:

1. A shaft-mounted planetary speed-reducing gear unit incorporating a balanced, self-aligning and self-distancing ring gear, and comprising a planet carrier (2) and an output shaft (3), with integral shafts (11) carrying planet pinions (10) which are turned by a sun gear (9) integral with a gear unit input shaft (8) and mesh with the internal teeth of a gear ring (12) fixed to a gear case wherein the gear ring (12) is connected by a pair of generally horizontal diametrically opposed appendages (13) to a pair of generally vertically-disposed hydraulic cylinders (14) located substantially parallel with each other at opposite sides of the gear unit and suspended by way of ball-and-socket joints (15 and 16) between the gear ring and a rigid structure; a piston (29) stroking with a barrel (30) of each hydraulic cylinder (14) separates a low pressure oil chamber (31) connected to a low pressure hydropneumatic accumulator (33) by a relative throttle valve (35) and a ball check valve (37), from a high pressure oil chamber (32) connected to a high pressure hydropneumatic accumulator (34) by a relative throttle valve (36) and ball check valve (38); the planet carrier (2), cantilevered at the end of the output shaft (3) of a driven machine (4) and equipped with a hub (24), joins with the gear unit input shaft(8) by way of a self-aligning roller bearing (17); the gear ring (12), whose internal teeth mesh with planet pinions (10) turning on the intergral shafts (11) by way of self-aligning roller bearings, is fixed to the gear case embodied in two halves: a first half (18) at the driven machine side joined to the periphery of the hub (24) of the planet carrier (2) by way of a rotary oil seal (20) and a second half (19) joining with the gear unit input shaft (8) by way of a rotary oil seal (21).

2. Gear unit as in claim 1 wherein the rotary oil seal (20) at the driven machine side comprises: a sleeve (22) extending from the first half of the gear case (18) and provided with internal grooves (23), which is allowed a generous degree of end float relative to the planet carrier hub (24); a radial lubricator orifice (25) giving access to one of the grooves (23), and radial drain orifices (27) permitting egress from each groove; two thrust rings (26), one farthest from the driven machine which abuts with a shoulder machined on the hub, the other breasted with a snap ring (28) limiting end float toward the driven machine.

* * * * *